Jan. 31, 1956     M. C. ELLISON     2,733,389
ELECTROLYTIC CAPACITOR
Filed Oct. 4, 1952

MICHAEL C. ELLISON
INVENTOR.

BY Edmund W. E. Kamm
ATTORNEY

2,733,389
ELECTROLYTIC CAPACITOR

Michael C. Ellison, Arlington, Va., assignor to The Gudeman Company, Chicago, Ill., a corporation of Illinois Application October 4, 1952, Serial No. 313,186

17 Claims. (Cl. 317—230)

This invention relates to an electrolytic capacitor of the tantalum type. More specifically, it relates to a capacitor which is made up of a multiple of units so that a high working voltage may be attained with a structure which occupies a minimum of space.

It is an object of the invention to provide a capacitor which will provide means for expansion of the unit to handle expansion of the electrolyte or any gas which may be generated in the unit.

Another object of the invention is to provide a unit which will be capable of a high working voltage and yet be compact and occupy a small volume of space.

A further object of the invention is to provide an electrolytic capacitor which is easy to manufacture and economical in the use of materials.

These and other objects will become apparent from a study of this specification and the drawings which are attached hereto, made a part hereof and in which.

Figure 1:
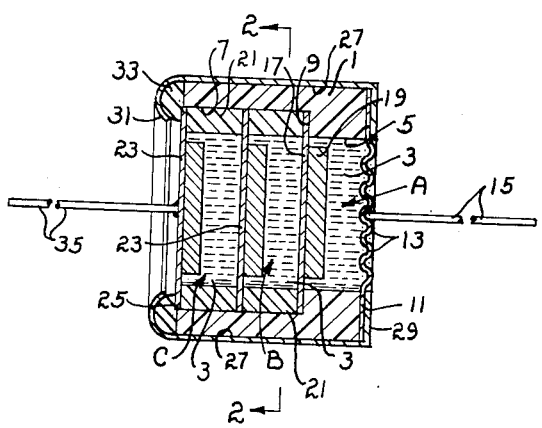
Figure 1 is a cross-sectional view taken on the longitudinal axis of the capacitor, showing the construction.
Figure 3:
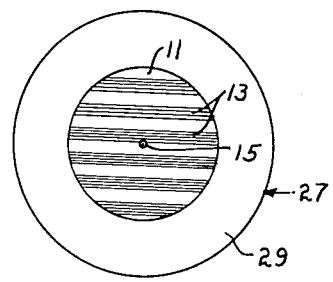
Figure 3 is an end elevation of the device of Figure 1 viewed from the right thereof, showing the diaphragm.
Figure 2:
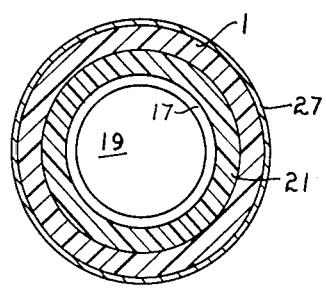
Figure 2 is a cross-sectional view taken substantially on line 2—2 of Figure 1.
Figure 4:
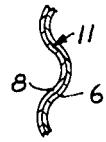

Figure 4 discloses a diaphragm made of silver-clad metal.

Referring to the drawing, the numeral 1 represents the body member which may be of any material which will not be attacked by the electrolyte 3, although I prefer to make it of polytetrafluoroethylene, more commonly known as "Teflon."

The body is preferably cylindrical and is provided with a bore 5 and a counterbore 7 which form a shoulder 9 at their intersection.

The end of the bore 5 remote from the shoulder is closed by a diaphragm 11 which is preferably of resilient material such as silver or a silver-clad spring material such as Phosphor bronze, shown at 6 in Figure 4; numeral 8 indicates the silver. In the case of a clad material, the silver is adjacent the chamber and in contact with the electrolyte since the silver acts as the cathode.

The diaphragm is preferably corrugated as shown at 13 to increase the deformability. It is also preferably molecularly bonded to the end of the body 1. A wire lead 15 is soldered to the silver forming the cathode.

A tantalum disc 17 fits in the counterbore 7 and rests on shoulder 9 to form with the body and diaphragm a chamber A.

This disc carries an integral cylindrical slug of sintered tantalum 19 on the surface which faces the cathode 11 and which slug is immersed in the electrolyte 3 which entirely, or almost entirely, fills the chamber A.

A cylindrical collar 21 of polytetrafluoroethylene or of silicone rubber or other suitable yieldable material is fitted snugly in the counterbore 7 and bears against the disc 17 to hold it against the shoulder 9. It is desired to seal off the chamber A against leakage of the electrolyte therefrom and to this end any suitable cement may be used in the joint if this necessary or desirable.

Additional disc and slug units 23 and collars 21 may be inserted in the counterbore to form additional chambers, depending upon the voltage desired and upon other controlling factors. Two additional units are shown forming chambers B and C which are also filled with electrolyte.

The disc of the final unit 23 preferably enters the counterbore only part way as shown at 25.

A case, preferably of metal has a bore 27 which snugly receives the body 1 and has a radially inwardly directed flange 29 which fits over the outer portion of the diaphragm 11 and is preferably coextensive with the thickness of the body. The other end of the case is turned or crimped over at 31 to form a bead and compresses an annular gasket 33 of silicone rubber, "Teflon" or other suitable material against the disc 23 and the end of the body. Here too, a suitable cement may be used if desired, to insure against leakage from the chamber C.

A lead wire 35 is welded or otherwise fixed to the disc of the outermost unit 23.

Operation

In the operation of capacitors of the type herein disclosed, pressures may be generated which would tend to produce leakage of the electrolyte or even rupture the chamber walls. During the initial period of operation of this type of unit a gas may be formed in the electrolyte thus subjecting the walls of the chamber to substantial pressures. Also, the capacitors are frequently subjected to relatively high temperatures which would expand the electrolyte and subject the walls to heavy pressures.

In the disclosed construction, the diaphragm 11 will yield to such pressures generated in chamber A either by the liquid or gas therein or by pressures created therein due to the deformation of the disc 17 which forms one wall of chamber A and which is deformed by pressures created in chamber B. The yieldable collars 21 permit the bowing or other displacement of the discs 17 so that pressure may be transmitted from one chamber to the other, longitudinally of the unit, and finally to the diaphragm 11.

Any reasonable number of chambers and elements 23 may be assembled in a single case with a single pressure relief mechanism so that a very compact capacitor is produced.

The material and construction disclosed above make it possible to use any of the electrolytes commonly used in tantalum capacitors, for example; sulphuric acid, lithium chloride, phosphoric acid solution, ammoniated ethylene glycol borate solution, etc.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A tantalum capacitor comprising means defining an electrolyte chamber, electrolyte disposed in and substantially filling said chamber, a tantalum member disposed in said chamber and having at least a portion thereof disposed in contact with the electrolyte, and expansion means including a diaphragm associated with the chamber and in communication therewith for relieving excessive pressures developed in said chamber.

2. A tantalum capacitor comprising means defining a main chamber, a number of tantalum members, means for mounting them in the main chamber to subdivide it into a number of electrolyte chambers, electrolyte disposed in and substantially filling said latter chambers, and expansion means associated with the main chamber and connected in communication with one of the electrolyte chambers for relieving excessive pressures developed in said electrolyte chambers.

3. A tantalum capacitor comprising means defining a main chamber, a number of tantalum members, means for yieldably mounting them in the main chamber to subdivide it into a number of electrolyte chambers, electrolyte disposed in and substantially filling said latter chambers, and expansion means associated with the main chamber and connected in communication with one of the electrolyte chambers for relieving excessive pressures developed in said electrolyte chambers.

4. A tantalum capacitor comprising means defining a main chamber, a number of yieldable tantalum members, means for yieldably mounting them in the main chamber to subdivide it into a number of electrolyte chambers, electrolyte disposed in and substantially filling said latter chambers, and expansion means associated with the main chamber and connected in communication with one of the electrolyte chambers for relieving excessive pressures developed in said electrolyte chambers.

5. A tantalum capacitor comprising means defining a chamber, a number of tantalum members, means for sealingly disposing them in spaced relation in said chamber to subdivide it into a number of electrolyte chambers one of said members adapted to be mounted at one end as a closure member, a lead affixed to the closure member, an electrode, means for sealingly mounting it in said chamber in spaced relation to the member at the other end of the chamber to define therewith an electrolyte chamber, a lead connected with said electrode and an electrolyte disposed in and substantially filling the electrolyte chambers.

6. A tantalum capacitor comprising means defining a chamber, a number of tantalum members each comprising a thin sheet of tantalum having a tantalum slug affixed to one side, means for sealingly mounting said members in spaced, sealing relation in said chamber to subdivide it into electrolyte chambers, a wall of electrically conductive material, means for mounting said wall in sealing relation in one end of said chamber to form with one member an electrolyte chamber and an electrolyte disposed in and substantially filling said chambers.

7. A tantalum capacitor comprising means defining a chamber, a number of tantalum members each comprising a thin sheet of tantalum having a tantalum slug affixed to one side, means for sealingly mounting said members in spaced, sealing relation in said chamber to subdivide it into electrolyte chambers, a wall of electrically conductive material, means for supporting said wall in sealing relation in one end of said chamber to form with one member an electrolyte chamber and an electrolyte disposed in and substantially filling said chambers, said members being disposed so that one tantalum slug occupies each electrolyte chamber.

8. In a tantalum capacitor, a substantially tubular body, a tantalum member, means for sealingly mounting said member on the body so as to close one end thereof, a cathode, means for sealingly mounting said cathode on the body so as to close the other end thereof to define a chamber and an electrolyte disposed within and substantially filling the chamber formed by the body, member and cathode, said cathode being constructed and arranged so as to be readily deformable by fluid pressure in said chamber.

9. In a tantalum capacitor, a substantially tubular body, a tantalum member, means for sealingly mounting said member on the body so as to close one end thereof, a cathode, means for sealingly mounting said cathode on the body so as to close the other end thereof to define a chamber and an electrolyte disposed within and substantially filling the chamber formed by the body, member and cathode, said cathode being corrugated in part so as to be readily deformable by fluid pressure in said chamber.

10. In a tantalum capacitor, a substantially tubular body, a tantalum member, means for sealingly mounting said member on the body so as to close one end thereof, a cathode, means for sealingly mounting said cathode on the body so as to close the other end thereof to define a chamber and an electrolyte disposed within and substantially filling the chamber formed by the body, member and cathode, said cathode being of yieldable material formed so as to be readily deformable by fluid pressure in said chamber.

11. In a tantalum capacitor, a substantially tubular body, a tantalum member, means for sealingly mounting the member on the body so as to close one end thereof, a cathode, means for sealingly mounting said cathode on the body so as to close the other end thereof to define a chamber and an electrolyte disposed within and substantially filling the chamber formed by the body, member and cathode, said cathode being constructed of silver and being formed so as to be readily deformable by fluid pressure in said chamber.

12. In a tantalum capacitor, a substantially tubular body, a tantalum member, means for sealingly mounting said member on the body so as to close one end thereof, a cathode, means for sealingly mounting said cathode on the body so as to close the other end thereof to define a chamber and an electrolyte disposed within and substantially filling the chamber formed by the body, member and cathode, said cathode being constructed of silver and being formed with corrugations so as to be readily deformable by fluid pressure in said chamber.

13. In a tantalum capacitor, a substantially tubular body, means forming a shoulder in the interior of said body, a tantalum member comprising a thin walled element disposed in said bore with said element in sealing relation with said shoulder, a spacer collar mounted in the tube in contact with the element, a second tantalum member mounted in sealing relation with the collar and a cathode, means for mounting said cathode in sealing relation with the end of the bore adjacent the first mentioned member, said cathode and members forming a number of electrolyte chambers, and an electrolyte disposed in and substantially filling each chamber.

14. In a tantalum capacitor, a substantially tubular body, means forming a shoulder in the interior of said body, a tantalum member comprising a thin walled element disposed in said bore in sealing relation with said shoulder, a spacer collar mounted in the tube in contact with the element, a second tantalum member mounted in sealing relation with the collar, a cathode, means for mounting said cathode in sealing relation with the end of the bore adjacent the first mentioned member, said cathode and member forming a number of electrolyte chambers, and an electrolyte disposed in and substantially filling each chamber, said cathode being of yieldable material and constructed so as to yield to pressure in the adjacent electrolyte chamber.

15. In a tantalum capacitor, a substantially tubular body, means forming a shoulder in the interior of said body, a tantalum member comprising a thin walled element disposed in said bore with said element in sealing relation with said shoulder, a spacer collar mounted in the tube in contact with the element, a second tantalum member mounted in sealing relation with said collar, a cathode, means for mounting said cathode in sealing relation with the end of the bore adjacent the first mentioned member, said cathode and members forming a number of electrolyte chambers, and an electrolyte disposed in and substantially filling each chamber, said cathode being of yieldable material and constructed so as to yield to pressure in the adjacent electrolyte chamber, said spacer collars being of resilient material to permit movement of said members in response to pressure in said electrolyte chambers.

16. In a tantalum capacitor, a substantially tubular body, means forming a shoulder in the interior of said body, a tantalum member comprising a thin walled element disposed in said bore with said element in sealing relation with said shoulder, a spacer collar mounted in the tube in contact with the element, a second tantalum member mounted in sealing relation with the collar, a cathode mounted in sealing relation with the end of the bore adjacent the first mentioned member, said cathode and members forming a number of electrolyte chambers, an electrolyte disposed in and substantially filling each chamber, said cathode being of yieldable material and constructed so as to yield to pressure in the adjacent electrolyte chamber, and a metallic case enclosing said body, a seal of resilient material disposed adjacent the exposed tantalum member and the end of the body to seal the joint between them said case being disposed so as to hold the seal in place.

17. In a tantalum capacitor, a hollow body having an opening at each end, a number of tantalum members yieldably mounted in the hollow of the body to subdivide it into a number of electrolyte chambers, a yieldable, pressure responsive cathode member mounted to close one end of the body, and means for connecting the members, cathode and body in a unitary structure and an electrolyte disposed in and substantially filling the chambers.

References Cited in the file of this patent
UNITED STATES PATENTS

| | | |
|---|---|---|
| 2,558,172 | Clark | June 26, 1951 |
| 2,617,863 | Stinson | Nov. 11, 1952 |

OTHER REFERENCES

Electrical Manufacturing, vol. 46, issue 6, pages 82 to 85; December 1950. (Copy in Div. 48 (175-315 Pub.).)